United States Patent
Howell et al.

(10) Patent No.: US 7,344,356 B1
(45) Date of Patent: Mar. 18, 2008

(54) MECHANICAL SEAL WITH BELLOWS SEATING ALIGNMENT

(75) Inventors: Steven Alan Howell, Oklahoma City, OK (US); Edward Gross, Norman, OK (US)

(73) Assignee: Wood Group ESP, Inc., Oklahoma City, OK (US)

( * ) Notice: Subject to any disclaimer, the term of this patent is extended or adjusted under 35 U.S.C. 154(b) by 356 days.

(21) Appl. No.: 11/201,912

(22) Filed: Aug. 10, 2005

Related U.S. Application Data

(60) Provisional application No. 60/609,736, filed on Sep. 15, 2004.

(51) Int. Cl.
*F04D 29/10* (2006.01)

(52) U.S. Cl. .................. 415/174.2; 415/231; 277/352; 277/379; 277/391; 277/636

(58) Field of Classification Search .............. 415/174.2, 415/231; 277/352, 361, 336, 367, 379, 398, 277/391, 634, 636
See application file for complete search history.

(56) References Cited

U.S. PATENT DOCUMENTS

| | | | |
|---|---|---|---|
| 2,115,346 A | * | 4/1938 | Summers ..................... 277/379 |
| 4,095,808 A | * | 6/1978 | Glasson ..................... 277/372 |
| 4,342,538 A | | 8/1982 | Wolford et al. |
| 5,551,708 A | | 9/1996 | Vesey et al. |
| 6,568,686 B2 | | 5/2003 | Hadley |
| 6,805,357 B2 | * | 10/2004 | Dahlheimer ................ 277/377 |

* cited by examiner

*Primary Examiner*—Ninh H. Nguyen
(74) *Attorney, Agent, or Firm*—Crowe & Dunlevy, P.C.

(57) ABSTRACT

A mechanical seal having a stationary ring and a rotating portion. The rotating portion includes a runner adjacent the stationary ring, an elastomer bellows adjacent the runner, a spring retainer plate and a spacer positioned between the elastomer bellows and the spring retainer plate. The spacer sets and maintains the elastomer bellows in proper position adjacent the runner.

6 Claims, 5 Drawing Sheets

MECHANICAL SEAL WITH BELLOWS SEATING ALIGNMENT

RELATED APPLICATIONS

This application claims priority to U.S. Provisional Patent Application No. 60/609,736, entitled Seal Bellows Seating Alignment Method, filed Sep. 15, 2004, the disclosure of which is incorporated herein.

FIELD OF THE INVENTION

This invention relates generally to the field of submersible pumping systems, and more particularly, but not by way of limitation, to a mechanical seal for use with a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Other components commonly used include seal sections and gearboxes. Each of the components and subcomponents in a submersible pumping system must be engineered to withstand the inhospitable downhole environment, which includes wide ranges of temperature, pressure and corrosive well fluids.

For prolonged operation in the downhole environment, it is necessary to seal various internal components of the pumping system from corrosive well fluids and debris. Although there are a variety of components within the pumping system that are susceptible to unwanted fluid migration, moving parts, such as rotating shafts, are particularly difficult to seal. To prevent fluid leaks around rotating shafts, designers often employ mechanical seals that fit around the outer circumference of a cylindrical shaft.

As shown in FIG. 1, Prior Art mechanical seal designs may include elastomer bellows 10, a coiled spring 12, a runner 14 and a stationary ring 16. These components cooperate to prevent the migration of fluid along a centralized shaft 18. The stationary ring 16 has an internal diameter sized to permit the free rotation the shaft 18. In contrast, the elastomer bellows 10, springs 12 and runner 14 rotate with the shaft 18. The rotating runner 14 is held in place against the stationary face 16 by the spring-loaded rubber bellows 10. The bellows 10 has a fold that allows its length to adjust to keep the runner 14 in contact with the stationary face 16 if the shaft should experience axial displacement.

Limitations in presently available designs, however, can result in failures in the mechanical seal that allow well fluids to penetrate undesirable locations and to require costly repairs. After prolonged exposure to repetitive axial movement, the elastomer bellows 10 may slip from its intended position, thereby compromising the ability of the runner 14 to create a positive seal against the stationary face 16. It is to these and other deficiencies and requirements in the prior art that the present invention is directed.

SUMMARY OF THE INVENTION

In a preferred embodiment, the present invention includes a mechanical seal having a stationary ring and a rotating portion. The rotating portion includes a runner adjacent the stationary ring, an elastomer bellows adjacent the runner, a spring retainer plate and a spacer positioned between the elastomer bellows and the spring retainer plate. The spacer maintains the elastomer bellows in proper position adjacent the runner.

DETAILED DESCRIPTION OF THE PREFERRED EMBODIMENT

Figure 1:
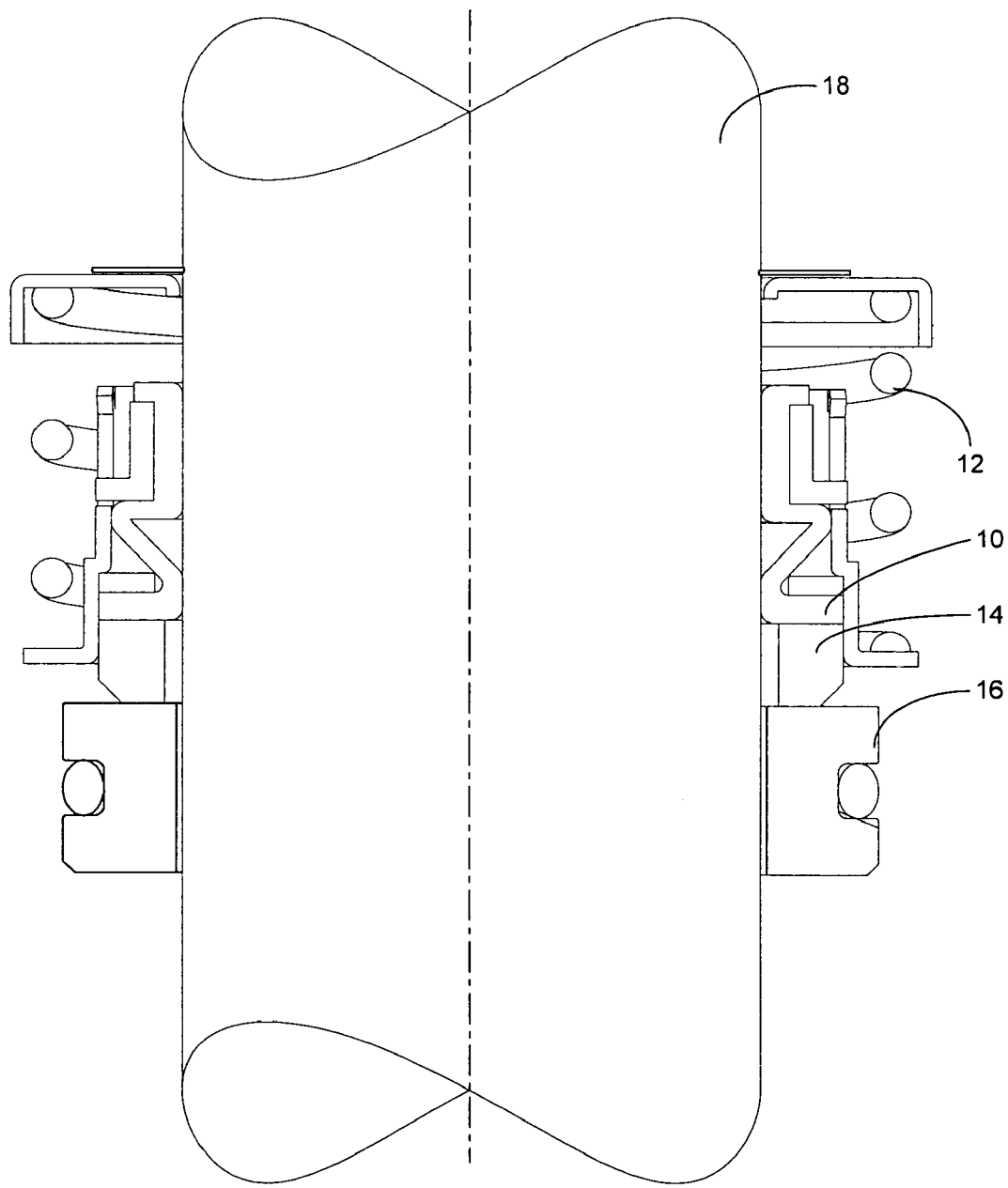
FIG. 1 is a partial cross-sectional view of a PRIOR ART mechanical seal.
Figure 2:
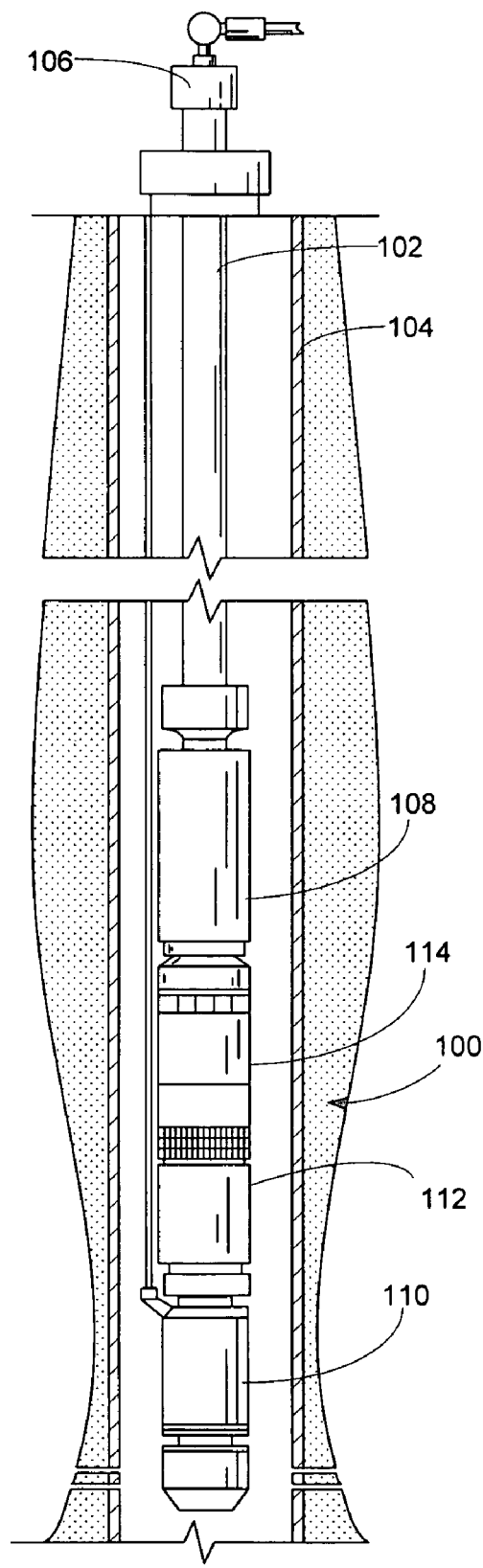
FIG. 2 is an elevational view of a submersible pumping system constructed in accordance with a presently preferred embodiment.

In accordance with a preferred embodiment of the present invention, FIG. 2 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110 and a seal section 112. The motor assembly 110 is preferably an electrical motor that receives power from a surface-mounted motor control unit (not shown). When energized, the motor assembly 110 drives a shaft linkage that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. For example, in many applications, it is desirable to use tandem-motor combinations, multiple gas separators, multiple seal sections and multiple pump assemblies.

Figure 3:
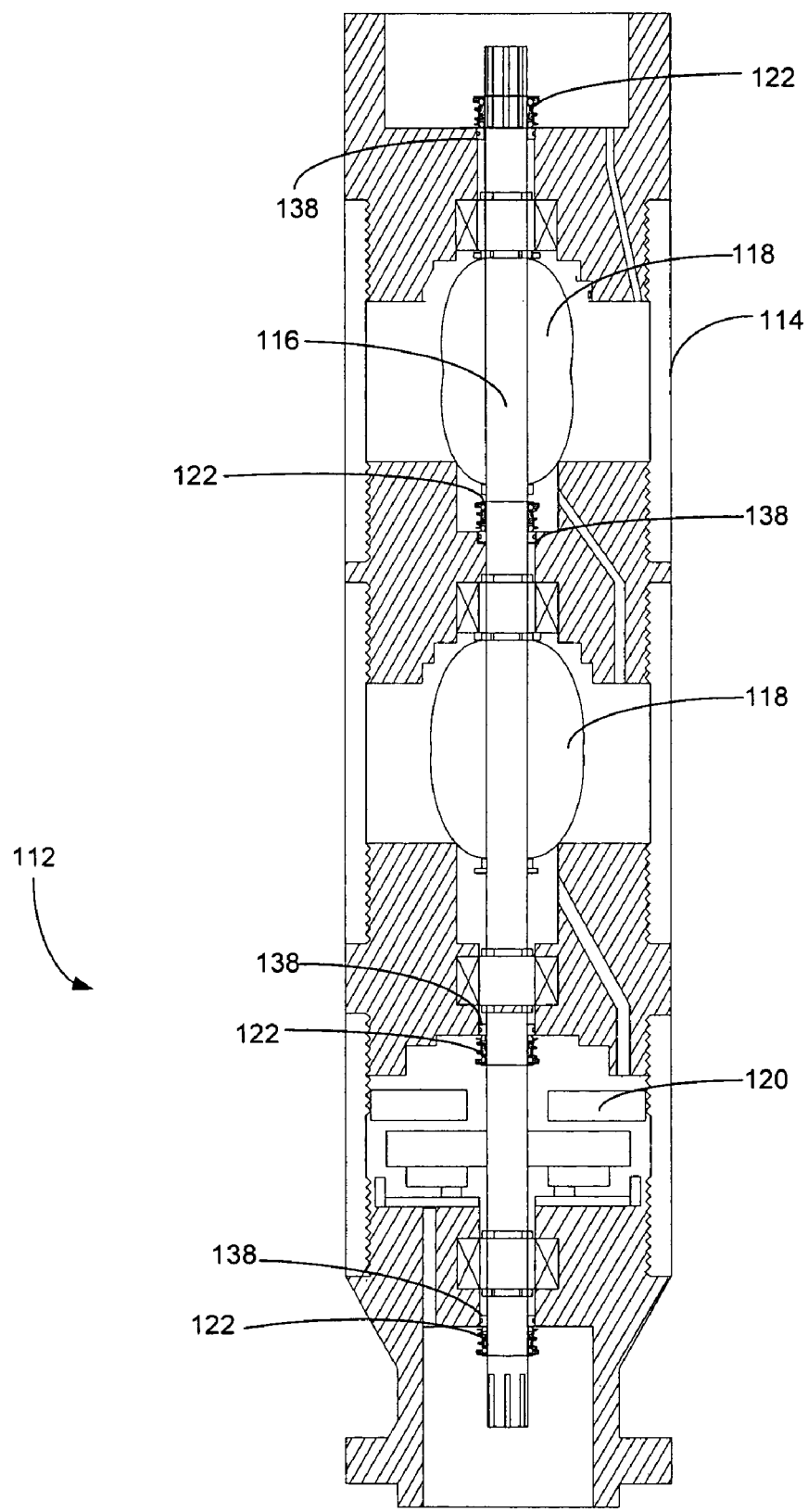
FIG. 3 is a cross-sectional view of a seal section for use with the submersible pumping system of FIG. 1.

Referring now to FIG. 3, shown therein is a cross-sectional view of the seal section 112. The seal section 112 includes a housing 114, a shaft 116, a plurality of elastomer bags 118 and thrust bearings 120. The elastomer bags 118 are configured to prevent the contamination of clean motor lubricants with wellbore fluids. The shaft 116 transfers mechanical energy from the motor assembly 110 to the pump assembly 108. The thrust bearings 120 are designed to limit the amount of axial displacement realized by the shaft 116 during operation. The seal section 112 also includes one or more mechanical seals 122. The mechanical seals 122 are located at various positions within the seal section 112 and limit the migration of fluid along the shaft 116.

Figure 4:
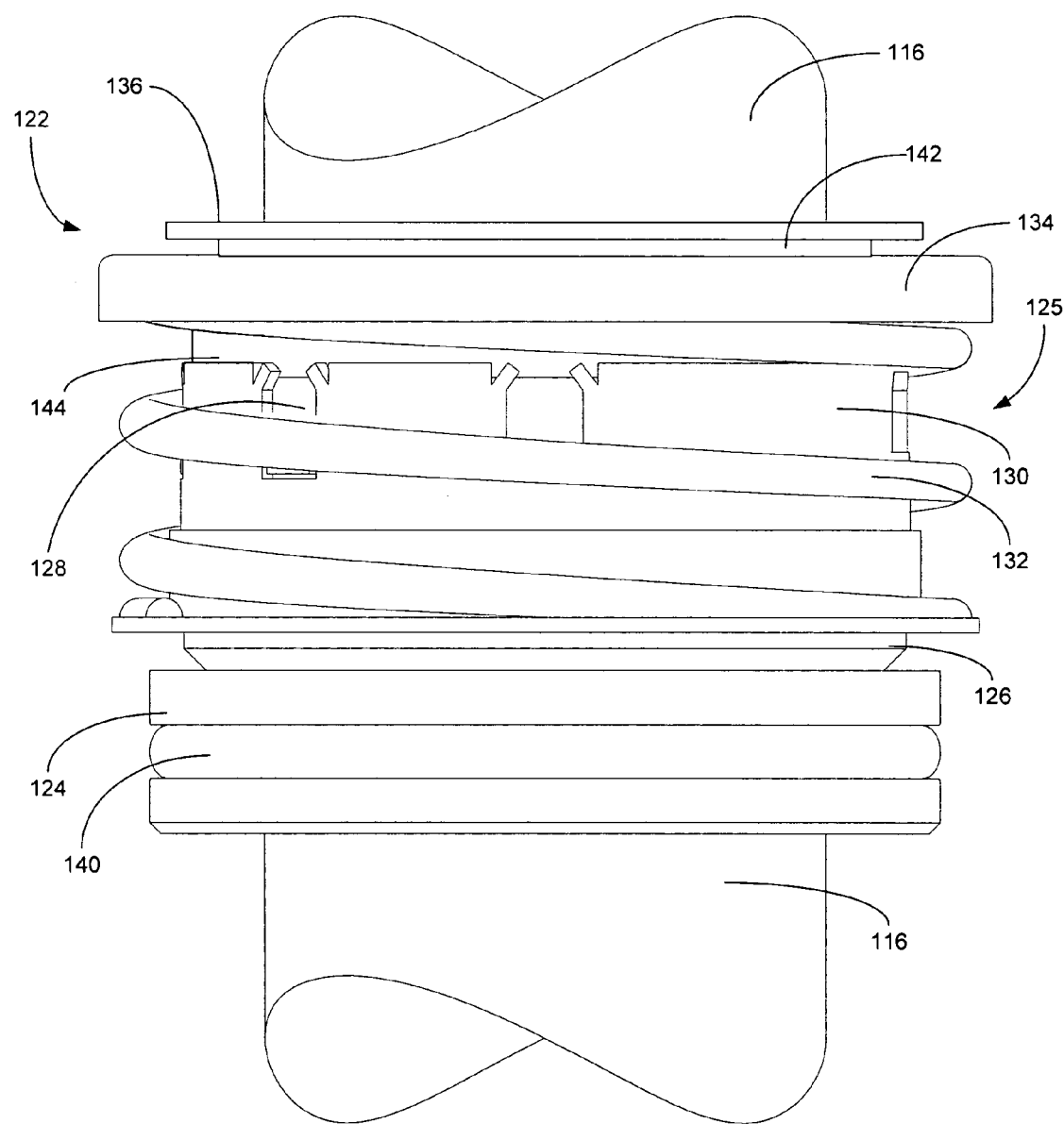
FIG. 4 is a front view of a mechanical seal for use with the pump assembly of FIG. 1.
Figure 5:
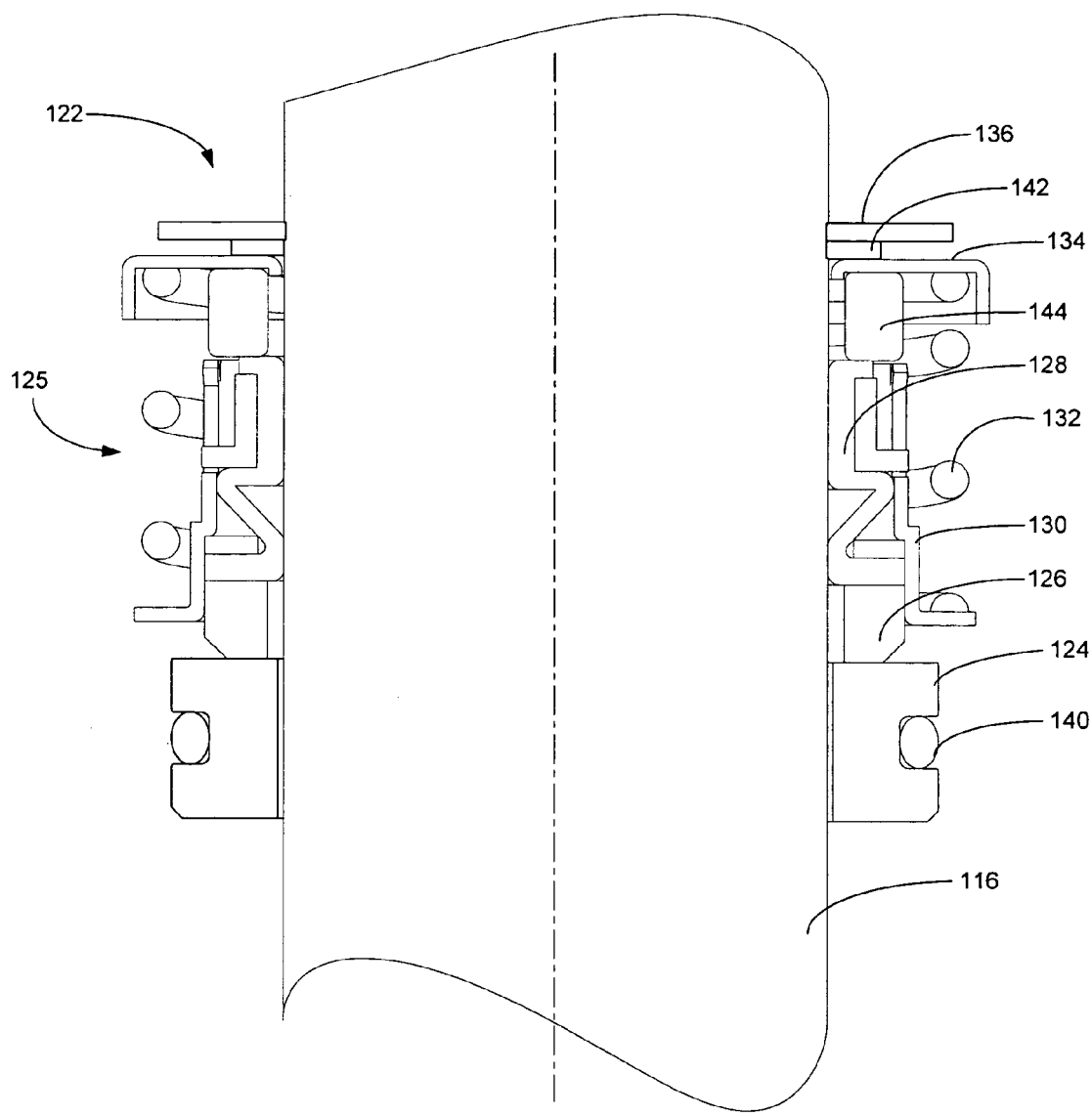
FIG. 5 is a partial cross-sectional view of the mechanical seal of FIG. 4.

Turning now to FIGS. 4 and 5, shown therein are front elevational and front cross-sectional views, respectively, of the mechanical seal 122 and the shaft 116. The mechanical seal 122 preferably includes a stationary ring 124 and a rotation portion 125. The outer diameter of the stationary ring 124 is preferably sized and configured for placement within a bore 138 (see FIG. 3). The stationary ring 124 preferably includes an o-ring 140 that prohibits the movement of fluid around the outer diameter of the stationary ring 124 into the bore 138. The inner diameter of the stationary ring 124 is preferably slightly larger than the outer diameter of the shaft 116 to permit the free rotation of the shaft 116 within the stationary ring 124.

The passage of fluid under the stationary ring 124 is blocked by the contact between the rotation portion 125 and the stationary ring 124. The rotating portion 125 preferably includes a rotating ring (or "runner") 126, an elastomer bellows 128, a bellows housing 130, a spring 132, a spring retaining plate 134 and a retainer ring 136. The runner 126 is held in contact with the stationary ring 124 by the spring-loaded elastomer bellows 128. The elastomer bellows 128 are held in place against the shaft 116 by the bellows housing 130 and pressed against the runner 126 by the coiled spring 132. The spring 132 is contained by the spring retaining plate 134, which is in turn secured to the shaft 116 by the retaining ring 136. In this way, the spring 132 is captured between the spring retaining plate 134 and the bellows housing 130.

In the presently preferred embodiment, the retaining ring 136 is secured within a "snap-ring" groove (not shown) on the shaft 116. It will be appreciated that other mechanisms for securing the retaining ring 136 to the shaft 116 are available, such as, for example, press-fittings, and are encompassed within the scope of the preferred embodiment. The retaining ring 136 is preferably constructed of a corrosion resistant metal, such as stainless steel, although it is contemplated that many metals and alloys are suitable for construction of the retaining ring 136. Similarly, the runner 126 and the stationary ring 124 are preferably constructed of a durable material, such as tungsten, silicon carbide or suitable ceramic. These materials are preferred due to their resistance to the abrasion caused by sand or other particulate matter frequently present in wellbore fluid that can wear components of the mechanical seal 122, although other resistant materials are also suitable.

When installed, the mechanical seal 122 is preferably "pre-loaded" by compressing the spring 132 to a desired extent and locking the mechanical seal 122 into position with the retaining ring 136. Shims 142 can be placed between the retaining ring 136 and the spring retaining plate 134 to adjust the extent of compression. Preloading the mechanical seal 122 enables the runner 126 to remain in contact with the stationary ring 124 in the event the shaft 116 experiences axial displacement. The elastomer bellows 128 preferably include one or more folds that allow the elastomer bellows 128 to stretch or compress as the rotation portion 125 moves with the shaft 116.

To keep the elastomer bellows 128 seated in proper position, the mechanical seal 122 also includes a spacer ring 144. The spacer ring 144 is positioned on the shaft 116 between the bellows housing 130 and the spring retaining plate 134. In a presently preferred embodiment, the spacer ring 144 is constructed from a suitable elastomer material, such as HSN or Aflas. Alternatively, the spacer ring 144 can be constructed from a suitable metal, such as carbon steel or stainless steel. The spacer ring 144 can be keyed or press-fit onto the shaft 116. The spacer ring 144 prevents the elastomer bellows 128 from moving out of alignment and influences the compression and expansion of the mechanical seal 122. The spacer ring 144 ensures that the elastomer bellows 128 is correctly located on the shaft 116 to compensate for shaft movement and setting changes.

Although the preferred embodiment has been demonstrated for use within a seal section 112, it will be understood that application of the invention can be within any component that employs a rotating shaft wherein the prevention of fluid flow is desired. Among the possible applications include but are not limited to motors, pumps and gearboxes. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A mechanical seal comprising:
   a stationary ring;
   a runner adjacent the stationary ring;
   an elastomer bellows adjacent the runner;
   a spring retainer plate;
   a spacer positioned between the elastomer bellows and the spring retainer plate;
   a bellows housing; and
   a spring captured between the bellows housing and the spring retainer plate.

2. The mechanical seal of claim 1, further comprising:
   a retaining ring; and
   a shim located between the retaining ring and the spring retainer plate.

3. A pumping system comprising:
   a motor assembly;
   a pump assembly driven by the motor assembly;
   a seal section positioned between the pump assembly and the motor assembly, wherein the seal section includes:
      a mechanical seal having a stationary ring, a runner adjacent the stationary ring, an elastomer bellows adjacent the runner, a spring retainer plate and a spacer positioned between the elastomer bellows and the spring retainer plate;
   a bellows housing; and
   a spring captured between the bellows housing and the spring retainer plate.

4. The pumping system of claim 3, wherein the mechanical seal further includes:
   a retaining ring; and
   a shim located between the retaining ring and the spring retainer plate.

5. A seal section for use in a downhole pumping system, the seal section comprising:
   a mechanical seal having a stationary ring, a runner adjacent to the stationary ring, an elastomer bellows adjacent to the runner, a spring retainer plate and a spacer positioned between the elastomer bellows and the spring retainer plate;

a bellows housing;

a spring captured between the bellows housing and the spring retainer plate;

a thrust bearing; and an elastomeric bag.

6. The seal section of claim 5 wherein the mechanical seal further includes:

a retaining ring; and a shim located between the retaining ring and the spring retainer plate.

* * * * *